(12) United States Patent
Watanabe et al.

(10) Patent No.: US 8,553,347 B2
(45) Date of Patent: Oct. 8, 2013

(54) INFORMATION RECORDING DEVICE AND INFORMATION RECORDING METHOD

(75) Inventors: Hikaru Watanabe, Ome (JP); Hideaki Tanaka, Kawasaki (JP); Tatsuya Haga, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 87 days.

(21) Appl. No.: 13/348,925

(22) Filed: Jan. 12, 2012

(65) Prior Publication Data
US 2012/0194946 A1  Aug. 2, 2012

(30) Foreign Application Priority Data

Jan. 31, 2011  (JP) .................................. 2011-019245

(51) Int. Cl.
  *G11B 15/12*  (2006.01)
(52) U.S. Cl.
  USPC .................. 360/62; 360/60; 360/55; 360/53; 360/39
(58) Field of Classification Search
  None
  See application file for complete search history.

(56) References Cited

U.S. PATENT DOCUMENTS

| 7,813,066 B2 * | 10/2010 | Nakagawa et al. ............. 360/39 |
| 7,852,598 B1 * | 12/2010 | Sutardja ...................... 360/77.07 |
| 2008/0204915 A1 * | 8/2008 | Albrecht et al. ................ 360/48 |

FOREIGN PATENT DOCUMENTS

| JP | 2008-146753 | 6/2008 |
| JP | 2010-152988 | 7/2010 |
| JP | 2010-182406 | 8/2010 |

* cited by examiner

*Primary Examiner* — Muhammad N Edun
(74) *Attorney, Agent, or Firm* — Knobbe, Martens, Olson & Bear LLP (57) ABSTRACT

According to one embodiment, an information recording device includes: a recording controller configured to control recording of information on a magnetic recording medium having tracks by a recording method; a managing module configured to manage two or more counters corresponding to each of plural track groups that are adjacent to each other; an updating module configured to update a count of one of the two or more counters corresponding to a second track group that is adjacent to a first track group of the plural track groups when information has been recorded on the first track group; a determining module configured to determine an attribute of the second track group based on the updated count of the one counter; and a rewriting module configured to rewrite information recorded in the second track group based on the determined attribute.

8 Claims, 5 Drawing Sheets

• WRITING IS PERFORMED ON BAND Bn

FIG. 5C

• COUNTERS OF BAND Bn ARE CLEARED
• COUNTER OF BAND-Bn-SIDE ONE OF TWO COUNTERS OF EACH OF BANDS Bn-1 AND Bn+1 IS INCREMENTED
• BAND Bn+1 IS MANAGED AS WRITE NON-PRIORITY BAND

· WRITING IS PERFORMED ON BAND Bn

FIG. 6C

· COUNTERS OF BAND Bn ARE CLEARED
· COUNTER OF BAND-Bn-SIDE ONE OF TWO COUNTERS OF EACH OF BANDS Bn-1 AND Bn+1 IS INCREMENTED
· BAND Bn+1 IS MANAGED AS WRITE PRIORITY BAND

INFORMATION RECORDING DEVICE AND INFORMATION RECORDING METHOD

CROSS REFERENCE TO RELATED APPLICATION(S)

The application is based upon and claims the benefit of priority from Japanese Patent Application No. 2011-019245 filed on Jan. 31, 2011, the entire contents of which are incorporated herein by reference.

BACKGROUND

1. Field

The present invention relates to an information recording device and an information recording method for recording information on a recording medium.

2. Description of the Related Art

In recent years, various techniques have been developed to increase the recording capacity of a magnetic disk device (hereinafter also referred to as HDD) which is an information recording device. Among these techniques is a recording technique called "shingled write recording method." The shingled write recording method is a recording method in which information is recorded on a magnetic disk in such a manner that a recording track is superimposed on part of an adjacent track. The shingled write recording method makes it possible to increase the TPI (tracks per inch).

In the shingled write recording method, a track group (hereinafter also referred to as "band") consisting of plural adjacent tracks is defined as a unit of recording. At least one band capable of storing information is secured as a spare band. To update (rewrite) the information recorded on a certain band, update subject information is rewritten to a spare band rather than the band from which original information has been read. The band in which the original information has been recorded is used as a new spare band. In this manner, in the shingled write recording method, the spare band moves from one position to another.

In HDDs, a problematic phenomenon called ATI (adjacent track interference) that magnetic interference from a recording track affects the holding of information of a track adjacent to it may occur. Stored information may be destroyed by ATI. The ATI problem becomes more serious as TPI increases in the shingled write recording method, for example. The ATI problem is avoided by updating (rewriting) the information stored in each of tracks that appear vulnerable to API before it is affected. For example, if the number of times of recording on a track adjacent to a certain track has exceeded a prescribed number, the information recorded on the certain track is updated.

BRIEF DESCRIPTION OF THE DRAWINGS

A general configuration that implements the various features of embodiments will be described with reference to the drawings. The drawings and the associated descriptions are provided to illustrate embodiments and not to limit the scope of the embodiments.

DETAILED DESCRIPTION

According to one embodiment, an information recording device includes: a recording controller configured to control recording of information on a magnetic recording medium having tracks by a recording method, in which the recording is performed in units of a track group including plural adjacent tracks, and in which each pair of adjacent tracks overlap with each other; a managing module configured to manage two or more counters corresponding to each of plural track groups that are adjacent to each other; an updating module configured to update a count of one of the two or more counters corresponding to a second track group that is adjacent to a first track group of the plural track groups when information has been recorded on the first track group; a determining module configured to determine an attribute of the second track group based on the updated count of the one counter; and a rewriting module configured to rewrite information recorded in the second track group based on the determined attribute.

An embodiment will be hereinafter described with reference to the drawings.

Figure 1:
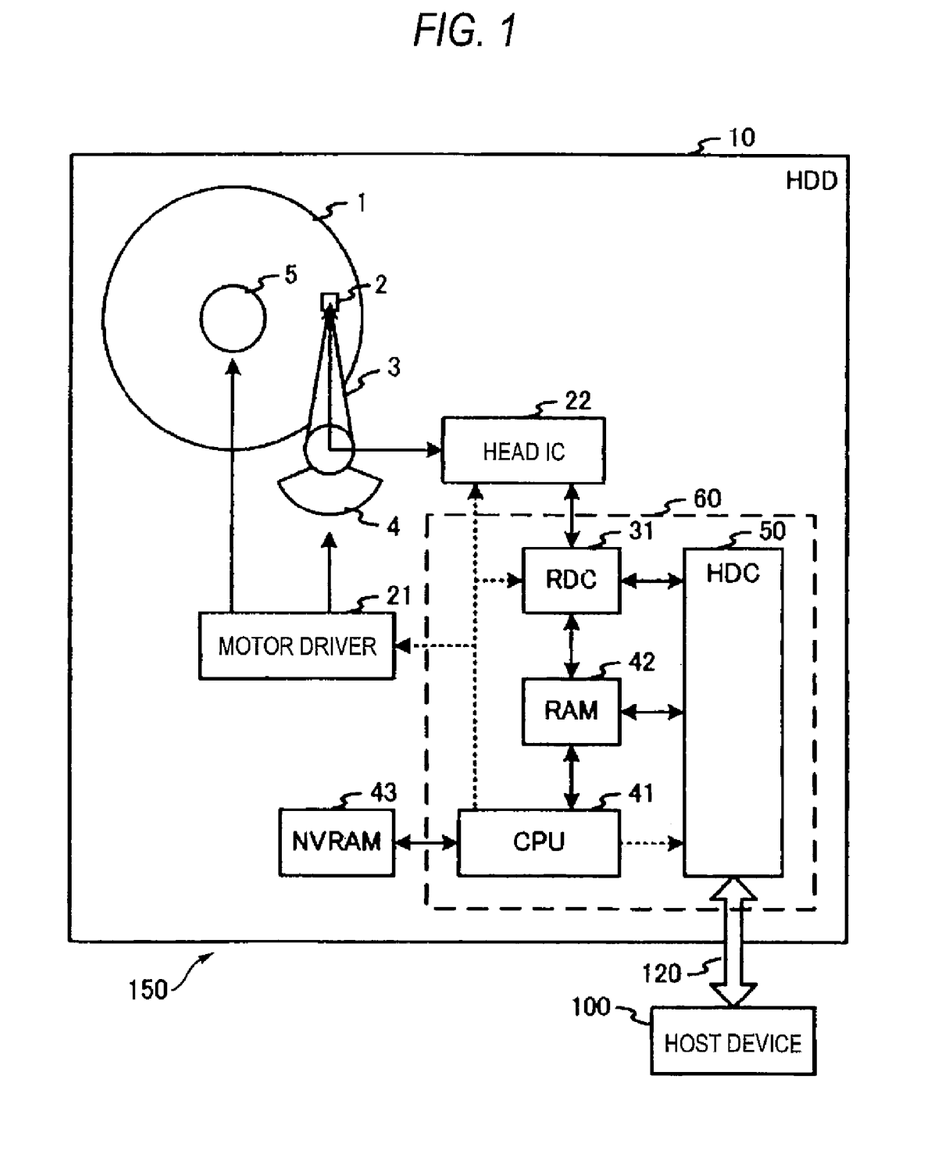
FIG. 1 is a block diagram showing the configuration of an electronic apparatus which is equipped with a magnetic disk device (HDD) as an information recording device according to an embodiment.

FIG. 1 is a block diagram showing the configuration of an electronic apparatus 150 which is equipped with a magnetic disk device (hereinafter also referred to as HDD) 10 as an information recording device according to the embodiment. The electronic apparatus 150 is also equipped with a host device 100. The HDD 10 is connected to the host device 100 via a communication medium (host I/F) 120 and functions as a storage module of the host device 100. The host I/F 120 connects the host device 100 and the HDD 10 and is used for exchanging data and commands between the host device 100 and the HDD 10. For example, the electronic apparatus 150 is a personal computer and the host device 100 is a chip set IC of the personal computer.

The HDD 10 according to the embodiment is equipped with mechanical components such as a magnetic disk 1, a slider 2, an arm 3, a VCM (voice coil motor) 4, and an SPM (spindle motor) 5. The HDD 10 is also equipped with circuit blocks such as a motor driver 21, a head IC 22, and a controller 60. The controller 60 includes a read/write channel IC (hereinafter also referred to as RDC) 31, a CPU 41, a RAM 42, an NVRAM 43, and an HDC (hard disk controller) 50.

In the HDD 10 according to the embodiment, information is recorded on the recording surface of the magnetic disk 1 by a write head (not shown) which is provided on the slider 2. To record information on the recording surface of the magnetic disk 1, the recording technique called "shingled write recording method" is used. The shingled write recording method is a recording method in which recording is performed on a track defined on the magnetic disk 1 in such a manner that overwriting is performed on part of an adjacent track (partial overwriting). In the shingled write recording method, a track group (hereinafter also referred to as "band") consisting of plural adjacent tracks is defined as a unit of recording. A midway track of the tracks of a track group cannot be subjected to re-recording; it is necessary to rewrite all the tracks of the band.

In the HDD 1, two counters that are correlated with the two respective bands adjacent each band are managed for each band. Each pair of counters are used for protecting the information stored in the associated band from the ATI (adjacent track interference) phenomenon which is caused by frequent recording on the adjacent bands. By virtue of the use of two counters for each band, the performance relating to recording operation can be improved in the HDD 10 according to the embodiment to which the shingled write recording method is applied.

Fixed to the SPM 5, the magnetic disk 1 is rotated being driven by the SPM 5. At least one surface of the magnetic disk 1 is a recording surface on which information is recorded magnetically. For example, plural concentric tracks are defined on the recording surface and each track has servo regions and data regions. Physical address information on the recording surface of the magnetic disk 1 is recorded in each servo region. Information is recorded in data regions on the basis of pieces of address information recorded in servo regions. In the embodiment, the shingled write recording method is employed as a method for recording information in data regions of the magnetic disk 1. Plural bands each consisting of plural tracks are defined on the recording surface of the magnetic disk 1.

The slider 2 is provided at one end of the arm 3 so as to be opposed to the recording surface of the magnetic disk 1. The slider 2 is provided with a read head and a write head (neither of which is shown). The read head reads a signal that is magnetically recorded on the recording surface of the magnetic disk 1. The read-out signal is output to the head IC 22 via conductor patterns formed on the arm 3. The write head magnetically records, on the recording surface of the magnetic disk 1, a write signal (write current) that is input from the head IC 22 via conductor patterns formed on the arm 3.

The arm 3 is provided with the slider 2 at one end and with a bearing portion (not shown) at the other end. The arm 3 is rotated with the bearing portion as a rotation center according to a drive current that is supplied to the VCM 4, and thereby moves the slider 2 in the radial direction over the recording surface of the magnetic disk 1.

The VCM 4 is driven according to a drive signal (current) that is supplied from the motor driver 21, and thereby rotates the arm 3.

The SPM 5 is driven according to a drive signal (current) that is supplied from the motor driver 21, and thereby rotates the magnetic disk 1.

The motor driver 21 supplies the VCM 4 and the SPM 5 with drive signals (currents) for driving them on the basis of control signals supplied from the CPU 41, respectively.

The head IC 22 amplifies a signal that is input from the read head of the slider 2 via the conductor patterns formed on the arm 3, and outputs an amplified signal to the controller 60 (more specifically, RDC 31) as read information. Furthermore, the head IC 22 outputs a write signal (write current) corresponding to recording information that is input from the controller 60 (more specifically, RDC 31), to the write head of the slider 2 via the conductor patterns formed on the arm 3.

The controller 60 is an SoC (system on chip) including the RDC 31, the CPU 41, the RAM 42, the HDC 50, etc. An alternative configuration is possible in which the controller 60 does not include the RAM 42 and the RAM 42 is provided outside and connected to the controller 60. The controller 60 manages two counters for each of the plural bands defined on the recording surface of the magnetic disk 1.

The RDC 31 decodes read information that is input from the head IC 22 by performing prescribed processing on it, and outputs resulting decoded information to the HDC 50. Furthermore, the RDC 31 encodes recording subject information that is input from the HDC 50 by performing prescribed processing on it, and outputs resulting coded information to the head IC 22 as recording information. The RDC 31 detects servo intervals, indicating servo regions, of the read information, and extracts pieces of position information from signals in the detected servo intervals. The extracted pieces of position information are output to the CPU 41. The RDC 31 uses the RAM 42 as a work memory in performing the above pieces of processing.

The CPU 41 is a processor for controlling the individual blocks of the HDD 10 by running programs stored in the NVRAM 43. For example, the CPU 41 controls operations of rotating the VCM 4 and the SPM 5 and recording information on the magnetic disk 1. In the embodiment, the CPU 41 runs a program for causing the controller 60 to function as a servo controller or a read/write controller. When the controller 60 operates as the read/write controller, information is recorded on the magnetic disk 1 by the shingled write recording method. In recording information, the controller 60 manages the execution of recording on plural bands defined on the recording surface of the magnetic disk 1. The CPU 41 uses the RAM 42 as a work memory in running the programs.

The RAM 42 is a work memory for the RDC 31, the CPU 41, and the HDC 50. The RAM 42 is a DRAM which is a volatile memory.

The NVRAM 43 is a nonvolatile memory for storing the programs to be run by the CPU 41. The programs stored in the NVRAM 43 can be updated. The NVRAM 43 also stores parameter values to be used in processing performed by the CPU 41.

The HDC 50 performs communication processing of transmitting and receiving information to and from the host device 100. The HDC 50 encodes decoded information that is input from the RDC 31 by performing prescribed processing on it, and transmits resulting coded information to the host device 100 as transmission information. The HDC 50 decodes reception information received from the host device 100 by performing prescribed processing on it, and outputs resulting decoded information to the RDC 31 as recording subject information. For example, the HDC 50 performs communication processing that complies with the SATA (serial advanced technology attachment) standard to communicate with the host device 100. When receiving, from the host device 100, a write command containing information indicating a logical address from which to start data recording and a recording data length, the HDC 50 extracts the information indicating the logical address and the recording data length from the received write command and outputs the extracted information indicating the logical address and the recording data length to the CPU 41.

In the above-configured HDD 10 according to the embodiment, information is recorded on the magnetic disk 1 by the plural blocks of the HDD 10 by the shingled write recording method. In recording information, the execution of recording on plural bands defined on the recording surface of the magnetic disk 1 is managed. In this management, two counters that are correlated with the two respective bands adjacent each band are used for each band. By virtue of the use of two counters for each band, the performance relating to recording operation can be improved in the HDD 10 according to the embodiment to which the shingled write recording method is applied.

Next, shingled write recording performed by the HDD 10 according to the embodiment and one mode of counter management of the shingled write recording will be described with reference to a conceptual diagram of FIG. 2.

Figure 2:
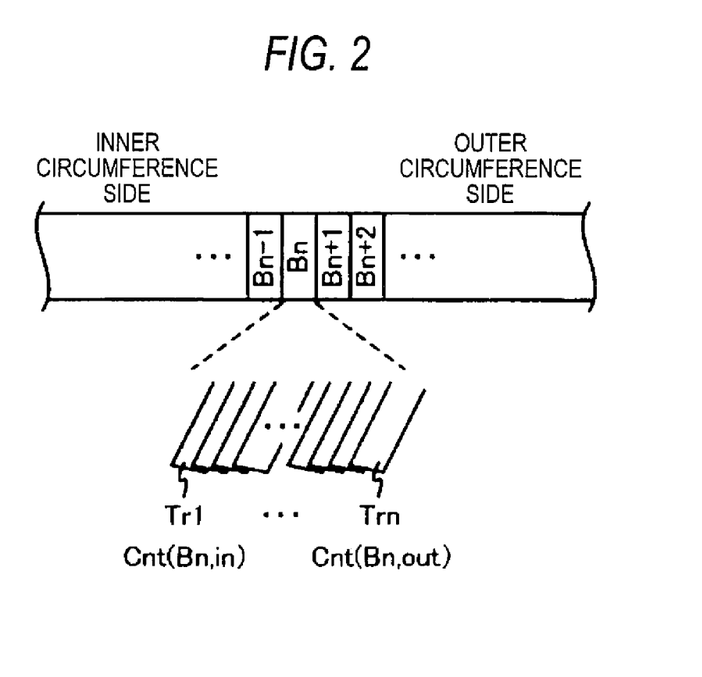
FIG. 2 is a conceptual diagram illustrating shingled write recording performed by the HDD according to the embodiment and one mode of counter management of the shingled write recording.

As shown in FIG. 2, the inner circumference side and the outer circumference side are defined on the recording surface of the magnetic disk 1. Plural bands . . . $B_{n-1}$, $B_n$, $B_{n+1}$, $B_{n+2}$, . . . each consisting of plural tracks are arranged on the recording surface in this order in the direction from the inner circumference side to the outer circumference side. The plural bands . . . $B_{n-1}$, $B_n$, $B_{n+1}$, $B_{n+2}$, . . . are assigned respective identifiers for management. The identifiers need not always be assigned in ascending order in the direction from the inner circumference side to the outer circumference side. Band $B_n$ includes plural tracks Tr1, . . . , Trn. Because of the shingled write recording, recording is performed in such a manner that track Tr2 is superimposed on part of track Tr1. Track Tr2 is a track that is adjacent to track Tr1.

Two counters are assigned to band B. The first counter Cnt($B_n$, in) is assigned to the innermost track Tr1 among the tracks of band $B_n$, and the second counter Cnt($B_n$, out) is assigned to the outermost track Trn among the tracks of band B. That is, the counter Cnt($B_n$, in) is provided to cope with ATI to band $B_n$, (more specifically, track Tr1) due to recording operations performed on band $B_{n-1}$, and the counter Cnt ($B_n$, out) is provided to cope with ATI to band $B_n$, (more specifically, track Trn) due to recording operations performed on band $B_{n+1}$. In other words, the two counters Cnt($B_n$, in) and Cnt($B_n$, out) assigned to band $B_n$ are managed being correlated with the two respective bands $B_{n-1}$ and $B_{n+1}$ adjacent to band $B_n$. Likewise, two counters are assigned to each of the other bands . . . $B_{n-1}$, $B_{n+1}$, $B_{n+2}$, . . . .

Instead of being assigned to the innermost track Tr1 and the outermost track Tr2 among the tracks of band $B_n$, the two counters Cnt($B_n$, in) and Cnt($B_n$, out) may be assigned to tracks in the vicinity of the tracks Tr1 and Tr2, respectively. The two counters Cnt($B_n$, in) and Cnt($B_n$, out) may be assigned to an inner-circumference-side region and an outer-circumference-side recording region, respectively, instead of tracks. Furthermore, the number of counters assigned to each band is not limited to two and may be larger than two.

Because two counters are assigned to each band in the above-described manner, the performance relating to recording operation can be improved in the HDD 10 according to the embodiment to which the shingled write recording method is applied.

Figure 3:
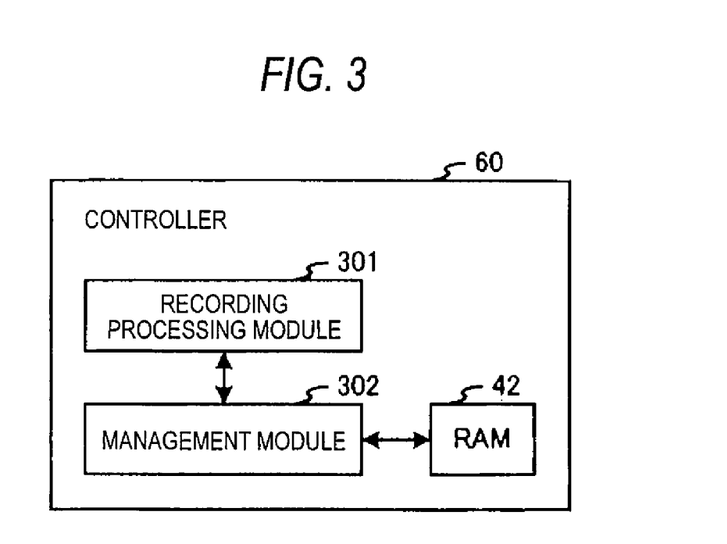
FIG. 3 is a block diagram of an example module which is provided in a controller according to the embodiment and which performs shingled write recording and counter management of the shingled write recording.

Next, an example module which is provided in the controller 60 according to the embodiment and which performs shingled write recording and counter management of the shingled write recording will be described with reference to a block diagram of FIG. 3.

The controller 60 is equipped with a recording processing module 301 and a management module 302 as modules for performing shingled write recording and its counter management. In other words, as described above with reference to FIG. 1, the controller 60 is given the recording processing module 301 and the management module 302 as the CPU 41 runs prescribed programs. That is, the recording processing module 301 and the management module 302 are modules that are realized through cooperation between the programs (software) that are run by the CPU 41 and hardware including at least the RDC 31 and the HDC 50. As mentioned above, the RAM 42 may be provided outside and connected to the controller 60.

The recording processing module 301 is a module for performing shingled write recording. The recording processing module 301 performs shingled write recording on the recording surface of the magnetic disk 1 on a band-by-band basis. The recording processing module 301 performs shingled write recording on the basis of information that is managed by the management module 302.

The management module 302 manages, for each band, as recording-related information, information relating to recording operations (shingled write recording operations) that have been performed on each band. The recording-related information is stored in the RAM 42, and is also stored, with prescribed timing, on part (e.g., a management information recording area) of the recording surface of the magnetic disk 1 or in a nonvolatile memory such as the NVRAM 43. In the embodiment, it is assumed that the recording-related information is stored in the RAM 42. The management module 302 counts the number of times of recording performed on each band, and manages the counted numbers of times of recording in such a manner that they are correlated with the pieces of recording-related information of the respective bands. The management module 302 supplies the recording-related information to the recording processing module 301.

As described above, shingled write recording is performed in such a manner that the number of times of recording performed on each band is managed by using the counters (two counters are assigned to each band). As a result, in the HDD 10 according to the embodiment to which the shingled write recording method is applied, the performance relating to recording operation can be improved.

Figure 4:
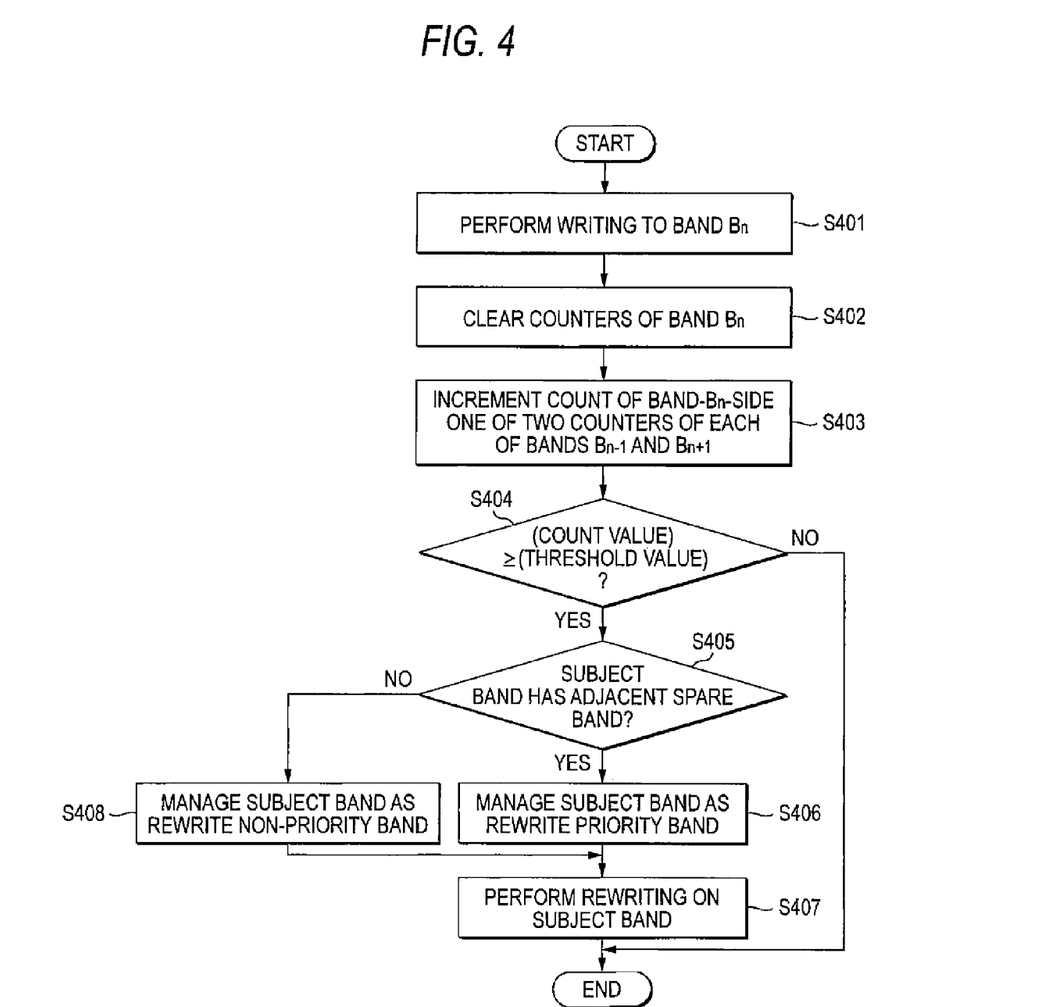
FIG. 4 is a flowchart for explaining a shingled write recording process with band-by-band counter management which is executed by the HDD according to the embodiment.

Next, a shingled write recording process with band-by-band counter management which is executed by the HDD 10 according to the embodiment will be described with reference to a flowchart of FIG. 4.

In the embodiment, when shingled write recording is performed on a certain band, the counts of the counters assigned to that band and the count of one of the counters assigned to each of the two adjacent bands are updated. The updated counts are compared with the prescribed threshold value, and the attribute of a subject band is determined according to comparison results. In determining the attribute of the subject band, whether the subject band has an adjacent spare band or not is taken into consideration. The attribute of the subject band is managed as one pieces of information of recording-related information.

In the shingled write recording method, at least one band capable of storing information is secured as a spare band. For example, to update the information of a certain band, update information is rewritten to a spare band rather than the original band from which the information has been recorded. The original band is thereafter used as a new spare band. In this manner, in the shingled write recording method, the spare band moves from one position to another. According to the embodiment, the performance of the HDD 10 relating to a recording operation that accompanies information rewriting which is necessarily performed in the shingled write recording method can be improved.

At step S401, the controller 60 operates as the read/write controller and shingled write recording is performed on band $B_n$. At step S402, the two counters that are assigned to the band $B_n$, are cleared. At step S403, the controller 60 updates, that is, increments by one, the count of the band-$B_n$-side one of the two counters assigned to each of bands $B_{n-1}$ and $B_{n+1}$ which are adjacent to band $B_n$. At step S404, it is judged whether or not the updated counts are larger than or equal to a prescribed threshold value, which is set at such a number as not cause an ATI phenomenon.

If at least one of the updated counts is larger than or equal to the prescribed threshold value (S404: yes), it is judged at step S405 whether or not a band that is adjacent, from the side opposite to band $B_n$, to band $B_{n-1}$ or $B_{n+1}$ that is assigned that counter is a spare band. If the adjacent band is a spare band (S405: yes), at step S406 the subject band (band $B_{n-1}$ or $B_{n+1}$) comes to be managed as a write priority band. The write priority band is a band on which information rewriting is performed preferentially in information rewrite processing of data refreshing, for example.

On the other hand, if the adjacent band is not a spare band (S405: no), at step S408 the subject band (band $B_{n-1}$ or $B_{n+1}$) comes to be managed as a write non-priority band. The write non-priority band is a band on which information rewriting is performed non-preferentially after write priority bands in information rewrite processing.

After the subject band has come to be managed as a write priority band or a write non-priority band, at step S407 information rewriting is performed on the subject band according to the managed priority rank. Also in this information rewriting, band-by-band counter management is performed. Then, the shingled write recording process with band-by-band counter management is finished. The shingled write recording process is also finished if both updated counts are smaller than the prescribed threshold value (S404: no).

A description will now be made of why whether a subject band is a spare band or not is judged. A description will be made of an example in which there are plural bands that require information rewriting and some of them have an adjacent spare band. If in this state information rewriting or recording of new information is performed on such a spare band, this recording may cause the count of one of the counters assigned to a band that requires information rewriting to exceed the prescribed threshold value. Therefore, information rewriting needs to be performed preferentially on bands having an adjacent spare band at least over bands having no adjacent spare band.

In the embodiment, as described above, the two counters assigned to band $B_n$ are cleared when shingled write recording has been performed on it. Alternatively, the counters of the two counters assigned to band $B_n$ may be updated to a smaller value.

As described above, in the HDD 10 according to the embodiment, shingled write recording with band-by-band counter management is performed. More specifically, the counts of counters are updated upon recording in a band, the updated counts are judged, and the attribute of a subject band is determined according to judgment results and whether the subject band has an adjacent spare band or not. In this manner, in the HDD 10 according to the embodiment to which the shingled write recording method is applied, the performance relating to recording operation can be improved.

Next, first and second specific examples of shingled write recording with band-by-band counter management which are performed by the HDD 10 according to the embodiment will be described with reference to conceptual diagrams of FIGS. 5A to 5C and FIGS. 6A to 6C.

FIRST SPECIFIC EXAMPLE

Figure 5A:
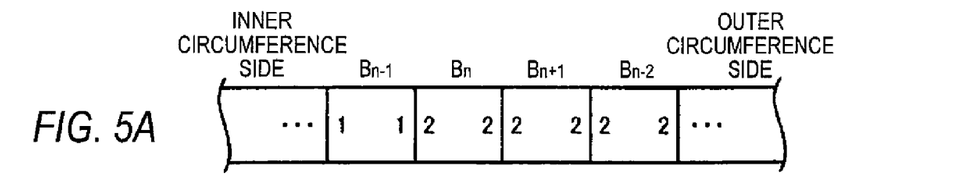
FIGS. 5A to 5C are conceptual diagrams illustrating a first specific example of shingled write recording with band-by-band counter management which is performed by the HDD according to the embodiment.
Figure 5B:
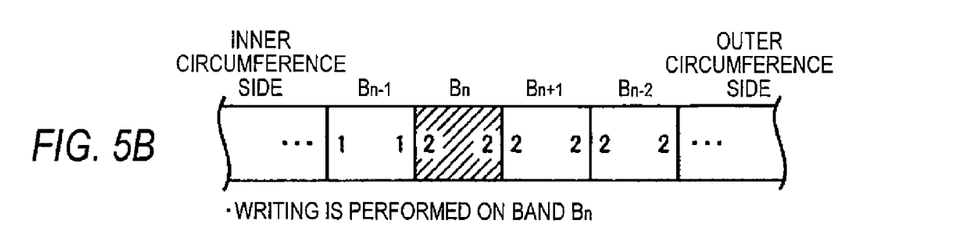
Figure 5C:
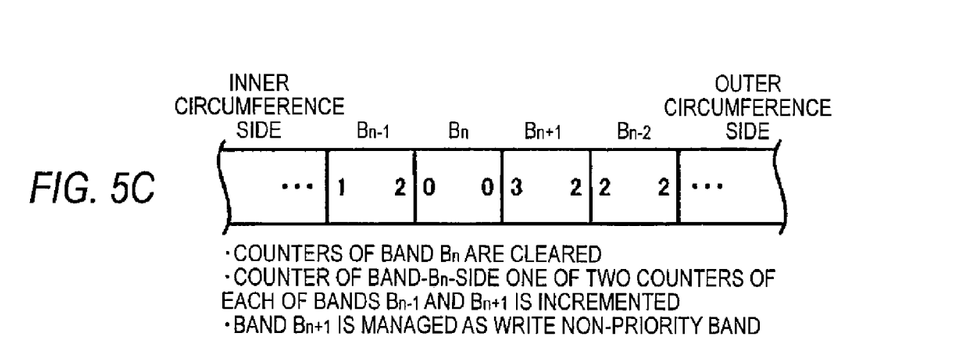

FIG. 5A shows an initial state in which both counters of band $B_{n-1}$ have a count "1" and both counters of each of bands $B_n$, $B_{n+1}$, and $B_{n+2}$ have a count "2". If recording (shingled write recording) is performed on band $B_n$ in this state as shown in FIG. 5B, the counts of the counters that are assigned to bands $B_{n-1}$, $B_n$, and $B_{n+1}$ are updated. More specifically, as shown in FIG. 5C, the counts of the two counters of band $B_n$ are cleared to "0." As for band $B_{n-1}$, the count of the counter Cnt ($B_{n-1}$, out), correlated with the outer-circumference-side band $B_n$, of the two counters assigned to band $B_{n-1}$ is updated from "1" to "2." As for band $B_{n+1}$, the count of the counter Cnt ($B_{n-1}$, in), correlated with the inner-circumference-side band $B_n$, of the two counters assigned to band $B_{n+1}$ is updated from $B_n$, of the two counters assigned to band $B_{n+1}$ is updated from "2" to "3." Band $B_{n+2}$ which is adjacent to band $B_{n+1}$ from the side opposite to band $B_n$ is not a spare band and hence is managed as a rewrite non-priority band.

SPECIFIC EXAMPLE 2

Figure 6A:
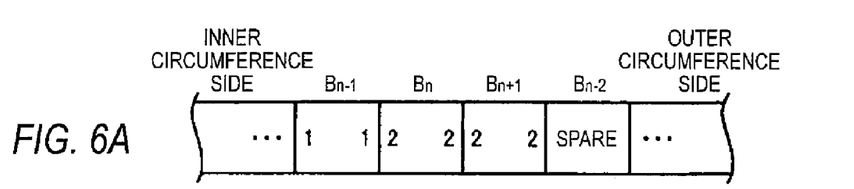
FIGS. 6A to 6C are conceptual diagrams illustrating a second specific example of shingled write recording with band-by-band counter management which is performed by the HDD according to the embodiment.
Figure 6B:
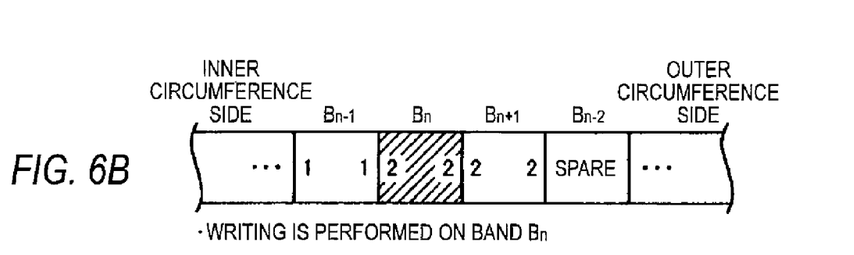
Figure 6C:
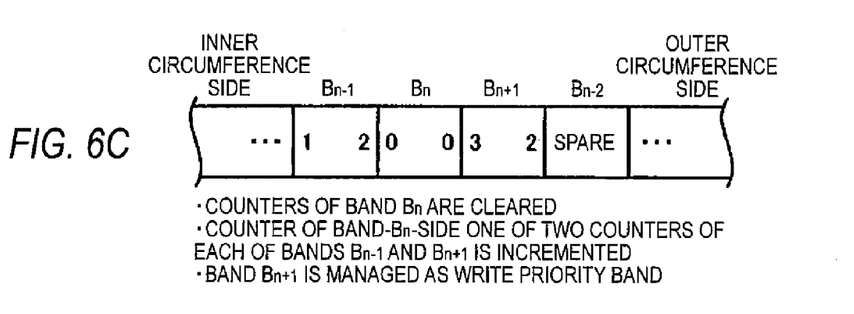

As seen from the conceptual diagrams of FIGS. 6A to 6C, the second specific example is different from the first one only in that band $B_{n+2}$ is a spare band. Therefore, only differences from the first specific example will be described in detail below.

If recording (shingled write recording) is performed on band $B_n$ as shown in FIG. 6B in an initial state of FIG. 6A, the counts of the counters that are assigned to bands $B_{n-1}$, $B_n$, and $B_{n+1}$ are updated as shown in FIG. 6C. In the second specific example, since band $B_{n+2}$ which is adjacent to band $B_{n+1}$ from the side opposite to band $B_n$ is a spare band, band $B_{n+1}$ is managed as a rewrite priority band.

In the above-described manner, the attribute of a band for which a judgment "information rewriting is necessary" has been made according to the count of the corresponding counter is determined depending on whether or not the band adjacent to it is a spare band. As such, in the HDD 10 according to the embodiment to which the shingled write recording method is applied, the performance relating to recording operation can be improved.

As described above, in the embodiment, information is recorded on the magnetic disk 1 by shingled write recording with band-by-band counter management. In this processing, the counts of counters are updated upon recording in a band, the updated counts are judged, and the attribute of a subject band is determined according to judgment results and whether the subject band has an adjacent spare band or not. Since shingled write recording is performed with band-by-band counter management, information rewriting is prevented from being performed earlier than timing when it becomes necessary. As a result, in the HDD 10 according to the embodiment to which the shingled write recording method is applied, the performance relating to recording operation can be improved.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information recording device comprising:
    a controller configured to control recording of information on a magnetic recording medium comprising tracks, wherein the recording is performed in units of a track group comprising plural adjacent tracks, wherein each pair of adjacent tracks overlap with each other;
    a managing module configured to manage two or more counters corresponding to each of plural track groups that are adjacent to each other;

an updating module configured to update a count of one of the two or more counters corresponding to a second track group that is adjacent to a first track group of the plural track groups if information has been recorded on the first track group;

a determining module configured to determine an attribute of the second track group based on the updated count of the one of the two or more counters corresponding to a second track group; and a rewriting module configured to rewrite information recorded in the second track group based on the determined attribute.

2. The information recording device according to claim 1, wherein
the updating module is configured to update a count of one counter of the two or more counters corresponding to the second track group, the counter being corresponding to a recording area that belongs to the second track group and being closer to the first track group.

3. The information recording device according to claim 1, wherein
the updating module is configured to update counts of the two or more counters corresponding to the first track group to a smaller value when the information has been recorded on the first track group.

4. The information recording device according to claim 1, wherein
when a third track group that is adjacent to the second track group from the side opposite to the first track group is a spare track group capable of storing information, the determining module is configured to employ an attribute indicating preferential information rewriting as the attribute of the second track group.

5. An information recording method of an information recording device which is provided with a magnetic recording medium having tracks, comprising:
controlling recording of information on a magnetic recording medium comprising tracks, wherein the recording is performed in units of a track group comprising plural adjacent tracks, wherein each pair of adjacent tracks overlap with each other;

managing two or more counters corresponding to each of plural track groups that are adjacent to each other;

updating a count of one of the two or more counters corresponding to a second track group that is adjacent to a first track group of the plural track groups if information has been recorded on the first track group;

determining an attribute of the second track group based on the updated count of the one of the two or more counters corresponding to a second track group; and rewriting information recorded in the second track group based on the determined attribute.

6. The information recording method according to claim 5, wherein:
in the updating, a count of one counter of the two or more counters corresponding to the second track group is updated; and
the counter is corresponding to a recording area that belongs to the second track group and is closer to the first track group.

7. The information recording method according to claim 5, wherein
in the updating, counts of the two or more counters corresponding to the first track group to a smaller value is updated when the information has been recorded on the first track group.

8. The information recording device according to claim 5, wherein
when a third track group that is adjacent to the second track group from the side opposite to the first track group is a spare track group capable of storing information, an attribute, indicating requiring preferential information rewriting as the attribute of the second track group, is employed in the determining.

* * * * *